June 9, 1925. 1,540,998
H. PLAUSON
CONVERSION OF ATMOSPHERIC ELECTRIC ENERGY
Filed Jan. 13, 1921   12 Sheets-Sheet 1

Inventor
Hermann Plauson
by Knight Bro
attorneys

June 9, 1925. 1,540,998
H. PLAUSON
CONVERSION OF ATMOSPHERIC ELECTRIC ENERGY
Filed Jan. 13, 1921 12 Sheets-Sheet 2
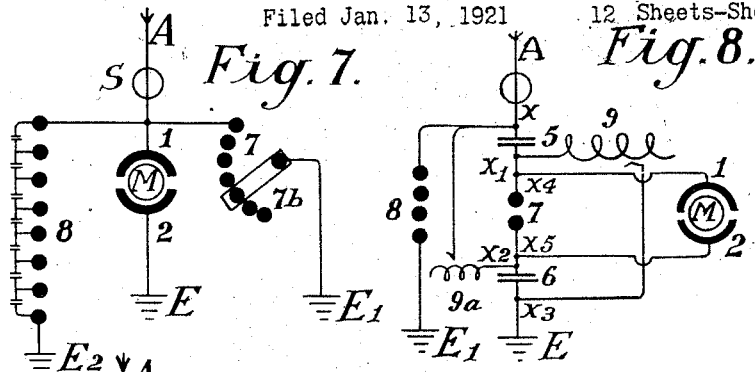
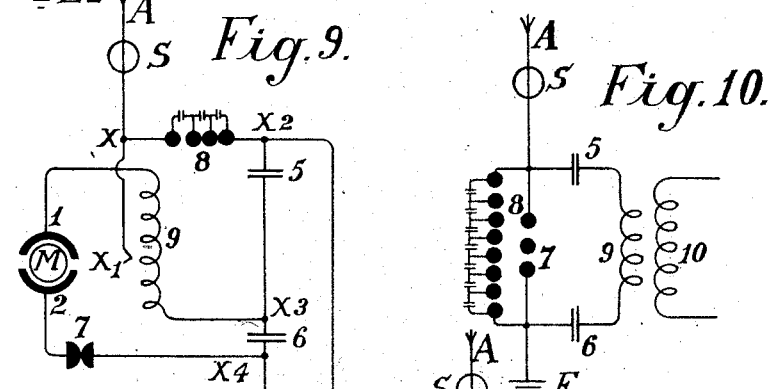
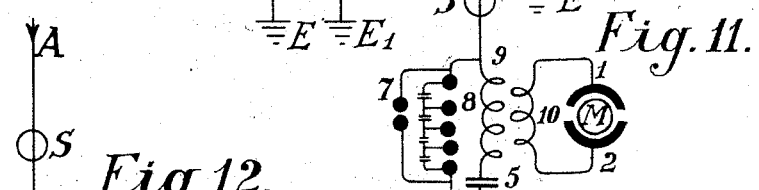
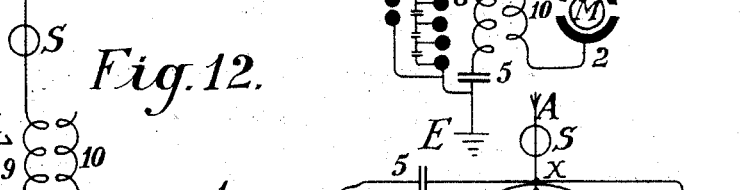
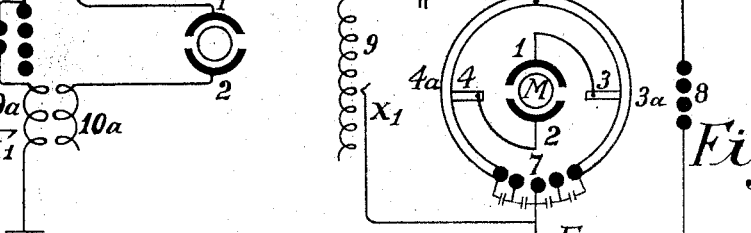
Inventor
Normann Plauson
by Knight Bros
Attorneys June 9, 1925. 1,540,998
H. PLAUSON
CONVERSION OF ATMOSPHERIC ELECTRIC ENERGY
Filed Jan. 13, 1921  12 Sheets-Sheet 3
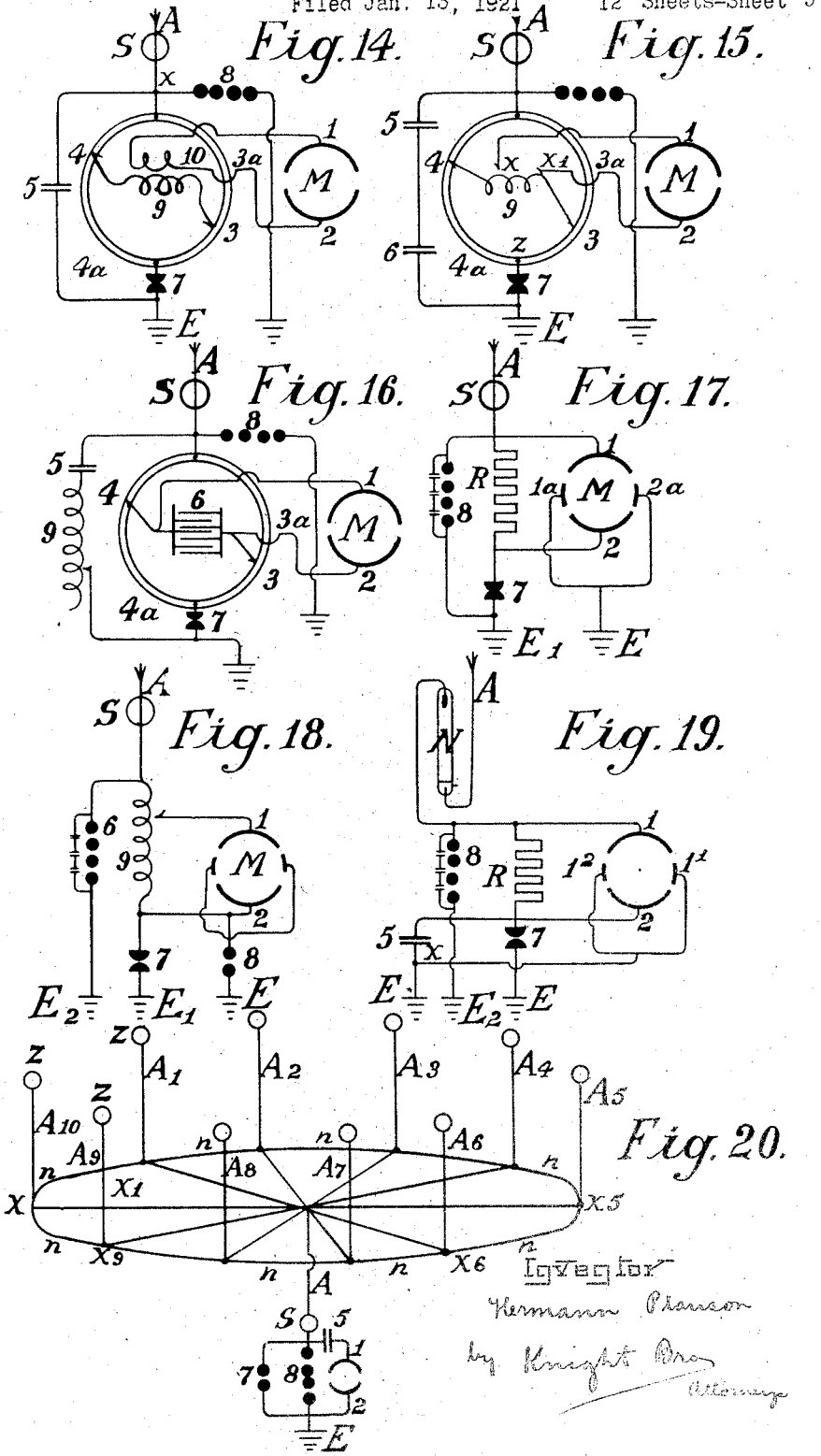

June 9, 1925.
H. PLAUSON
1,540,998
CONVERSION OF ATMOSPHERIC ELECTRIC ENERGY
Filed Jan. 13, 1921    12 Sheets-Sheet 4
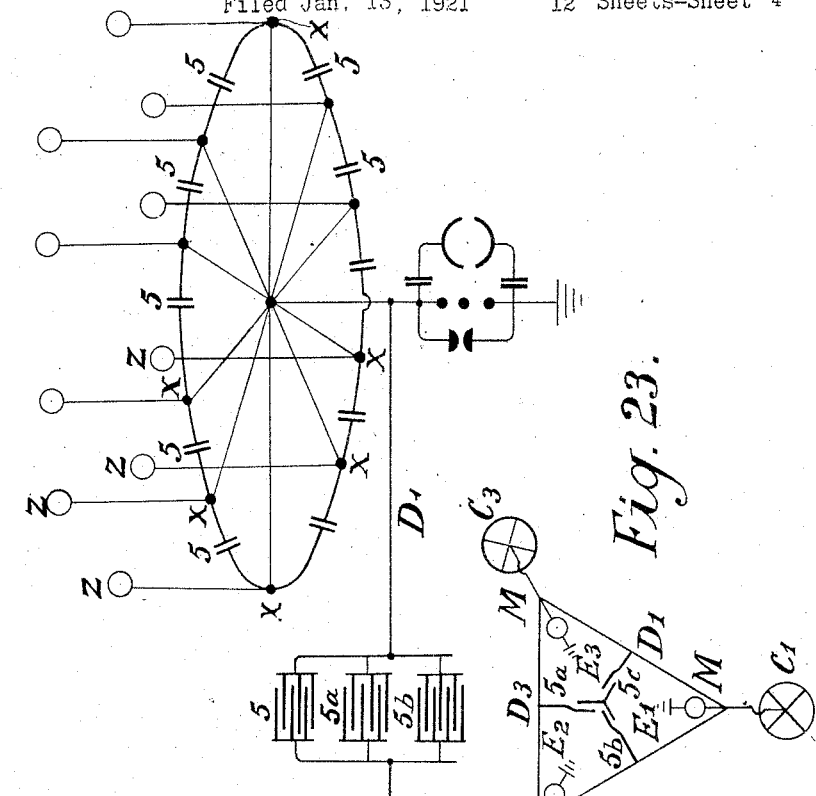
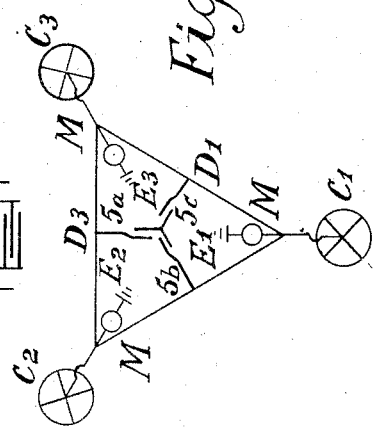
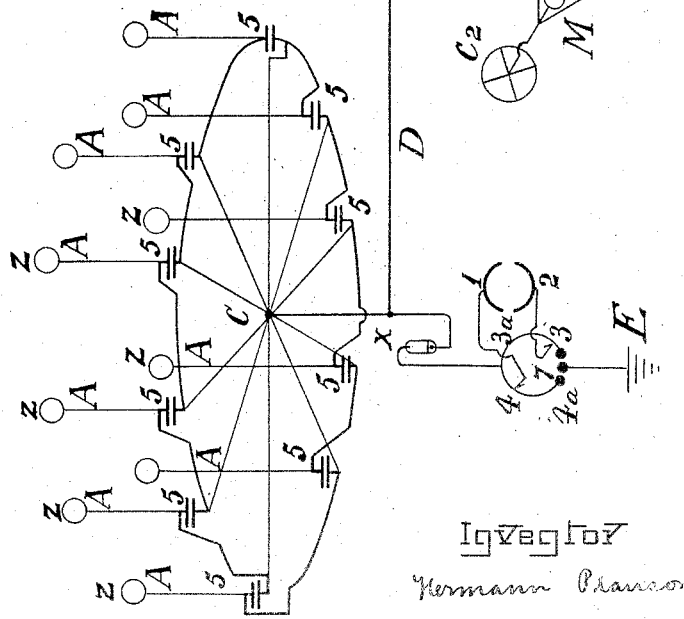

June 9, 1925.

H. PLAUSON 1,540,998

CONVERSION OF ATMOSPHERIC ELECTRIC ENERGY

Filed Jan. 13, 1921     12 Sheets-Sheet 6

*Fig. 25.*

June 9, 1925. 1,540,998
H. PLAUSON
CONVERSION OF ATMOSPHERIC ELECTRIC ENERGY
Filed Jan. 13, 1921. 12 Sheets-Sheet 10
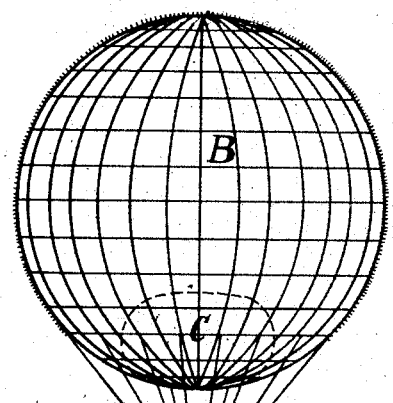
Fig. 29.
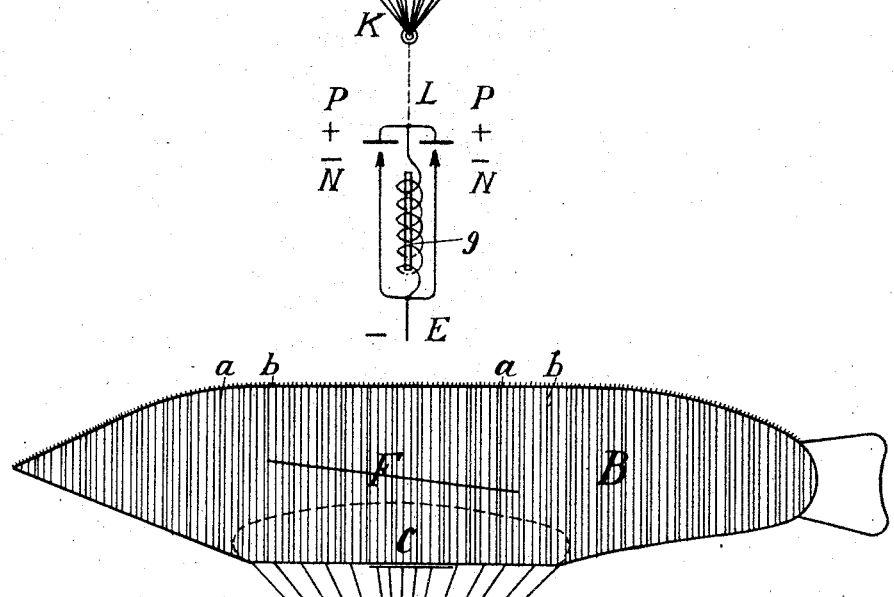
Fig. 30.
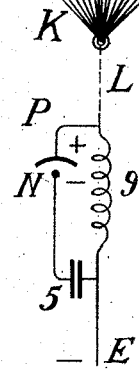
Inventor
Hermann Plauson
by
Knight Bros
Attorney June 9, 1925.  1,540,998
H. PLAUSON
CONVERSION OF ATMOSPHERIC ELECTRIC ENERGY
Filed Jan. 13, 1921  12 Sheets-Sheet 11
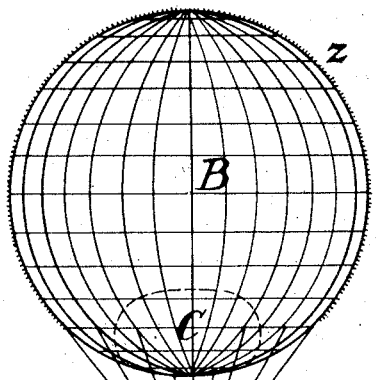
Fig. 31.
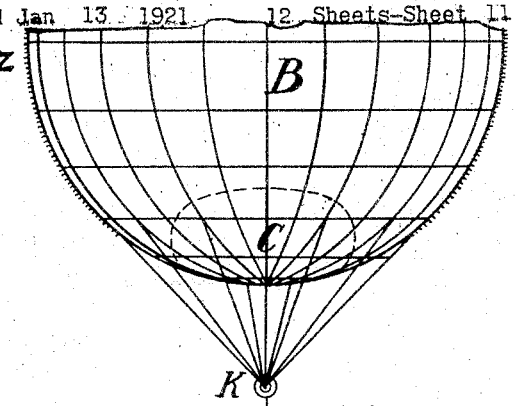
Fig. 32.
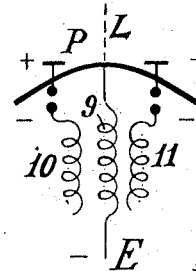
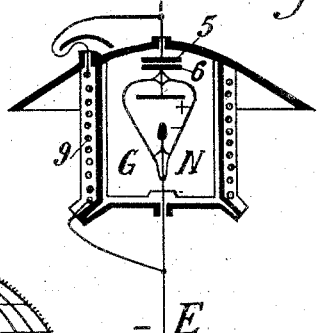
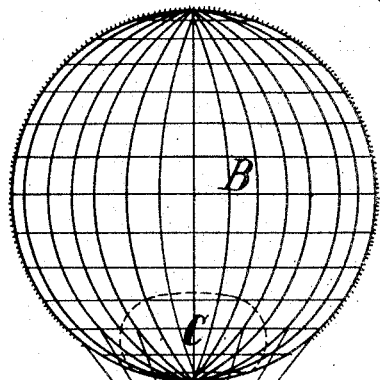
Fig. 33.
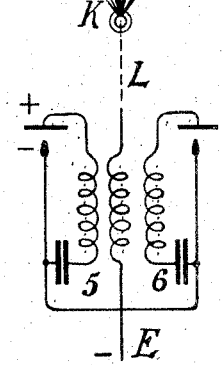
Inventor
Hermann Plauson
by Knight Bros
attorneys June 9, 1925.
H. PLAUSON
1,540,998
CONVERSION OF ATMOSPHERIC ELECTRIC ENERGY
Filed Jan. 13, 1921  12 Sheets-Sheet 12
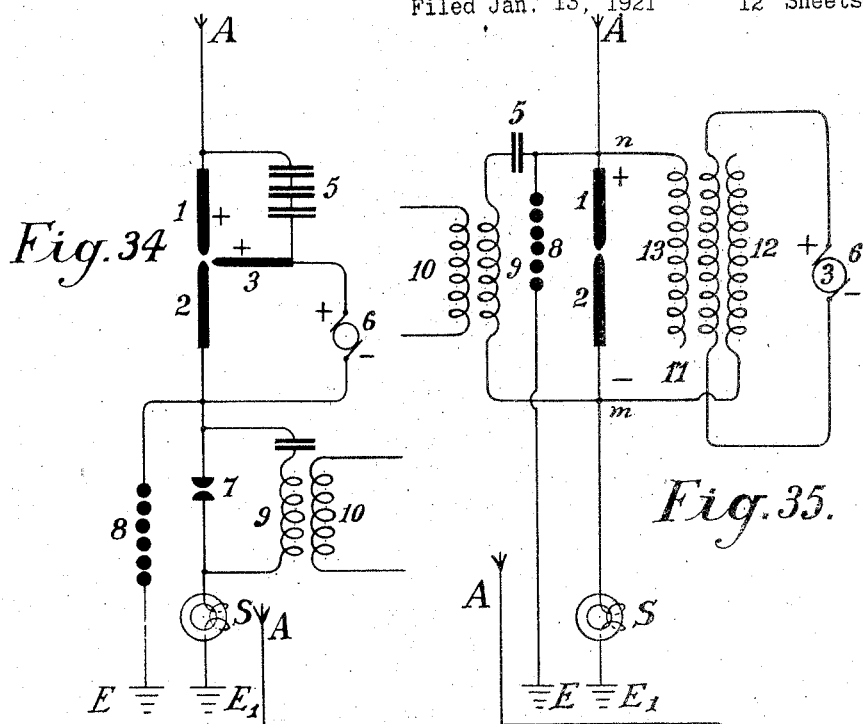
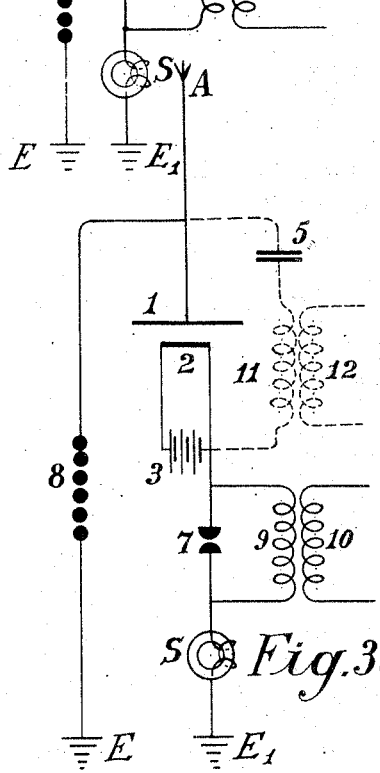
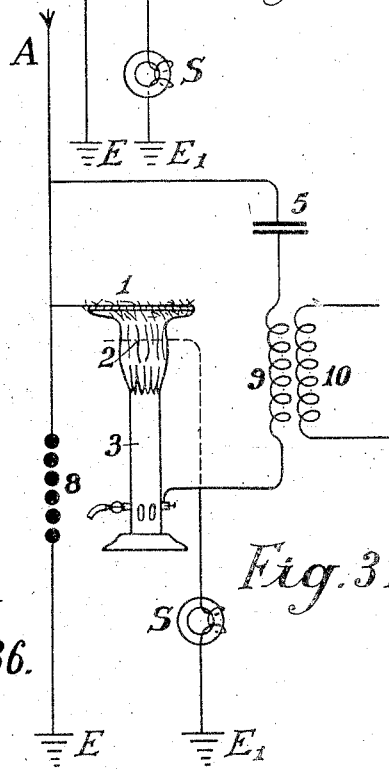

Patented June 9, 1925.

1,540,998

UNITED STATES PATENT OFFICE.

HERMANN PLAUSON, OF HAMBURG, GERMANY.

CONVERSION OF ATMOSPHERIC ELECTRIC ENERGY.

Application filed January 13, 1921. Serial No. 437,107.

*To all whom it may concern:*

Be it known that I, HERMANN PLAUSON, Esthonian subject, residing in Hamburg, Germany, have invented certain new and useful Improvements in the Conversion of Atmospheric Electric Energy, of which the following is a specification.

Methods of obtaining atmospheric electricity by means of metallic nettings set with spikes which are held by means of ordinary or anchored kite balloons made of fabrics and filled with hydrogen, are in theory already known. Atmospheric electricity obtained in this way has been suggested to be used in the form of direct current for the charging of accumulators. This knowledge however is at present only theoretical as the conversion in practice has hitherto been a failure. No means are known of protecting the apparatus from destruction by lightning. The balloons used for collecting the charge must also be made of very large size in order to be able to support the weight of the metallic netting and the heavy cable connections.

Instead of using heavy metallic netting as collectors attached to single air balloons of non-conducting materials which are liable to be torn and are permeable to the gas, it is proposed to use metallic balloon collectors which have the following important advantages—

(a) The metallic cases are impenetrable to helium and hydrogen; they also represent large metallic weather-proof collecting surfaces.

(b) Radio active means and the like may be easily applied internally or externally; whereby the ionization is considerably increased and therewith also the quantity of atmospheric electricity capable of being collected.

(c) Such balloon collectors of light metal do not require to be of large size as they have to carry only their own moderate weight, and that of the conducting cable or wire.

(d) The entire system therefore offers little surface for the action of storm and wind and is resistant and stable.

(e) Each balloon can be easily raised and lowered by means of a winch so that all repairs, recharging and the like can be carried out without danger during the operation.

It is further proposed to use a collecting aerial network of several separate collectors spread out in the air above the earth, which collectors are interconnected by electrical conductors.

According to this invention charges of atmospheric electricity are not directly converted into mechanical energy, and this forms the main difference from previous inventions, but the static electricity which runs to earth through aerial conductors in the form of direct current of very high voltage and low current strength is converted into electro-dynamic energy in the form of high frequency vibrations. Many advantages are thereby obtained and all disadvantages avoided.

The very high voltage of static electricity of a low current strength can be converted by this invention to voltages more suitable for technical purposes and of greater current strength. By the use of closed oscillatory circuits it is possible to obtain electromagnetic waves of various amplitude and thereby to increase the degree of resonance of such current. Such resonance allows various values of inductance to be chosen whereby again the governing of the starting and stopping of machines driven thereby by simply tuning the resonance between coils of the machine and the transformer circuit forming the resonance can easily be obtained. Further, such currents have the property of being directly available for various uses, even without employing them for driving motors, of which there may be particularly mentioned, lighting, production of heat and use in electro-chemistry.

Further, with such currents a series of apparatus may be fed without direct current supply through conductors and also the electro-magnetic high frequency currents may be converted by means of special motors adapted for electro-magnetic oscillations into mechanical energy, or finally converted by special machines into alternating current of low frequency or even into direct current of high potential.

The invention is more particularly described with reference to the accompanying diagrams in which:—

Figure 7 shows means whereby the spark gap length can be adjusted.

Figure 8 shows a unipolar connection for the motor.

Figure 9 shows a weak coupled system suitable for use with small power motors.

Figures 10, 11 and 12 show modified arrangements.

Figure 13 shows a form of inductive coupling for the motor circuit.

Figure 14 is a modified form of Figure 13 with inductive coupling.

Figure 15 is an arrangement with non-inductive motor.

Figure 16 is an arrangement with coupling by condenser.

Figures 17, 18 and 19 are diagrams of further modifications.

Figure 20 shows a simple form in which the aerial network is combined with special collectors.

Figure 21 shows diagrammatically an arrangement suitable for collecting large quantities of energy.

Figure 22 is a modified arrangement having two rings of collectors.

Figure 23 shows the connections for three rings of collectors.

Figures 25 and 26 show modified collector balloon arrangements.

Figure 29 shows the simplest form of construction with incandescent cathode.

Figure 30 shows a form with cigar shaped balloon.

Figure 31 is a modified arrangement.

Figure 32 shows a form with cathode and electrode enclosed in a vacuum chamber.

Figure 33 is a modified form of Figure 32.

Figure 34 shows an arc light collector.

Figure 35 shows such an arrangement for alternating current.

Figure 36 shows an incandescent collector with Nernst lamp.

Figure 37 shows a form with a gas flame.

Figure 1:
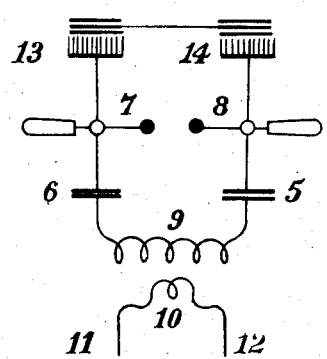
Figure 1 is an explanatory figure.

Figure 1 illustrates a simple diagram for converting static electricity into dynamic energy of a high number of oscillations. For the sake of clearness in the drawings an influence machine is assumed to be employed and not an aerial antenna. 13 and 14 are combs for collecting the static electricity of the influence machine. 7 and 8 are spark discharging electrodes, 6 and 5 condensers, 9 an inductive primary coil, 10 secondary coil, 11 and 12 ends of conductors of the secondary coil 10. When the disc of the static influence machine is rotated by mechanical means, the combs collect the electric charges one the positive and the other the negative, and charge the condensers 5 and 6 until such a high potential is formed across the spark gap 7—8, that the spark gap is jumped. As the spark gap 7—8 forms a closed circuit with condensers 6 and 5, and inductive resistance 9, as is well known, waves of high frequency electromagnetic oscillations will pass in this circuit.

The high frequency of the oscillations produced in the primary circuit induces waves of the same periodicity in the secondary circuit. Thus in the primary circuit electromagnetic oscillations are formed by the passage of the spark over the spark gap and these waves are maintained by fresh charges of static electricity.

By suitably selecting the ratio between the number of the coils in the primary and secondary circuits with regard to a correct application of the co-efficients of resonance (capacity, inductance, and resistance) the high voltage of the primary circuit may be suitably converted into low voltage and high current strength.

When the oscillatory discharges in the primary circuit becomes weaker or entirely cease, the condensers are charged again by the static electricity until the accumulated charge again breaks down the spark gap. All this is repeated as long as electricity is produced by the static machine by employing mechanical energy.

Figure 2:
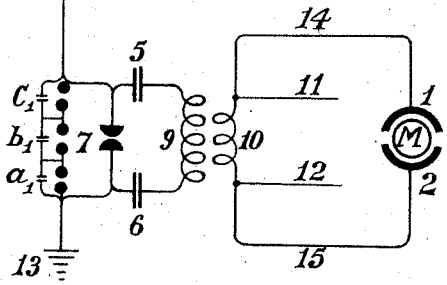
Figure 2 is a diagrammatic view of the simplest form.

An elementary form of the invention is shown in Figure 2 in which two spark gaps in parallel are used one of which may be termed the working gap 7 in Figure 2, whilst the second serves as a safety device for excess voltage and consists of a larger number of spark gaps than the working section, which gaps are arranged in series and are bridged by very small capacities as is illustrated in $a_1$, $b_1$, $c_1$, Figure 2 which allow of uniform sparking in the safety section.

In Figure 2 A is the aerial antenna for collecting charges of atmospheric electricity, 13 is the earth connection of the second part of the spark gap, 5 and 6 are condensers, 9 a primary coil. Now when through the aerial A the positive atmospheric electricity seeks to combine with the negative charge to earth, this is prevented by (the air gap between) the spark gaps. The resistance of the spark gap 7 is, as shown in the drawings, lower than that of the other safety section which consists of three spark gaps connected in series, and consequently a three times greater air resistance is offered by the latter.

So long therefore, as the resistance of the spark gap 7 is not overloaded, so that the other spark gaps have an equal resistance with it the discharges take place only over spark gap 7. Should however the voltage be increased by any influences so that it might be dangerous for charging the condensers 5 and 6 or for the coil insulation 9 and 10 in consequence of break down, by a correct regulation of this spark gap the second spark gap can discharge free from inductive effects direct to earth without endangering the machine.

Without this second spark gap, arranged in parallel having a higher resistance than the working spark gap it is impossible to collect and render available large quantities of electrical energy.

The action of this closed oscillation circuit consisting of spark gap 7, two condensers 5 and 6, primary coil 9, and also secondary coil 10 is exactly the same as the one described in Figure 1 with the arrangement of the static induction machine with the only difference that here the second spark gap is provided. The electromagnetic high frequency alternating current obtained can be tapped off from the conductors 11 and 12 for lighting and heating purposes. Special kinds of motors adapted for working with these peculiar electrical charges may be connected at 14 and 15 which can work with static electricity charges or with high frequency oscillations.

In addition to the use of spark gaps in parallel a second measure of security is also necessary for taking off the current. This precaution consists according to this invention, in the introduction of and method of connecting certain protective electromagnets or choking coils in the aerial circuit as shown by S in Figure 3.

A single electromagnet only having a core of the thinnest possible separate laminations is connected with the aerial.

In the case of high voltages in the aerial network or at places where there are frequent thunder storms, several such magnets may however be connected in series.

In the case of large units or plants several electromagnets can be employed in parallel or in series parallel.

The windings of these electromagnets may be simply connected in series with the aerials. In this case the winding preferably consists of several thin parallel wires, which make up together, the necessary section.

The winding may be made of primary and secondary windings in the form of a transformer. The primary winding will be then connected in series with the aerial network, and the secondary winding more or less short-circuited over a regulating resistance or an induction coil. In the latter case it is possible to regulate to a certain extent the effect of the choking coils. In the further description of the connecting and constructional diagrams the aerial electromagnet choke coil is indicated by a simple ring S.

Figure 3:
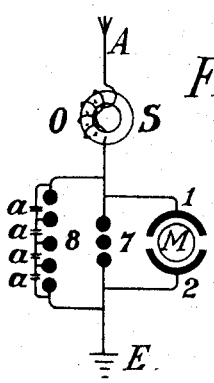
Figure 3 shows a method of converting atmospheric electrical energy for use with motors.

Figure 3 shows the simplest way of converting atmospheric electricity into electromagnetic wave energy by the use of special motors adapted for high oscillatory currents or static charges of electrical energy. Recent improvements in motors for working with static charges and motors working by resonance, that is to say, having groups of tuned electromagnetic cooperating circuits render this possible but such do not form part of the present invention.

A motor adapted to operate with static charges will for the sake of simplicity be diagrammatically indicated by two semicircles 1 and 2 and the rotor of the motor by a ring M. (Figure 3.) A is a vertical aerial or aerial network. S the safety choke or electromagnet with coil O as may be seen is connected with the aerial A. Adjacent the electromagnet S the aerial conductor is divided into three circuits, the circuit 8 giving the safety spark gap, the circuit 7 with the working spark gap, and then a circuit including the stator terminal 1, the rotor and stator terminal 2 at which a connection is made to the earth wire. The two spark gaps are also connected metallically with the earth wire. The method of working these diagrams is as follows:

The positive atmospheric electric charge collected tends to combine with the negative electricity (or earth electricity) connected with the earth wire. It travels along the aerial A through the electromagnet S without being checked as it flows in the same direction as the direct current. Further, its progress is arrested by two sparks gaps placed in the way and the stator condenser surfaces. The stator condenser surfaces are charged until the charge is greater than the resistance of the spark gap 7, whereupon a spark springs over the spark gap 7 and an oscillatory charge is obtained as by means of the motor M, stator surfaces 1 and 2, and spark gap 7, a closed oscillation circuit is obtained for producing the electromagnetic oscillations. The motor here forms the capacity and the necessary inductance and resistance, which, as is well known, are necessary for converting static electricity into electromagnetic wave energy.

The discharges formed are converted into mechanical energy in special motors and can not reach the aerial network by reason of the electromagnet or choke. If, however, when a spark springs over the spark gap 7 a greater quantity of atmospheric electricity tends to flow to earth, a counter voltage is induced in the electromagnet, which is greater the more rapidly and strongly the flow of current direct to the earth is. By the formation of this opposing voltage a sufficiently high resistance is offered to the flow of atmospheric electricity direct to earth to prevent a short circuit with the earth.

The circuit containing spark gap 8 having a different wave length which is not in resonance with the natural frequency of the motor, does not endanger the motor and serves as security against excess voltage, which, as practical experiments have shown, may still arise in certain cases, but can be conducted direct to earth through this spark gap.

Figure 4:
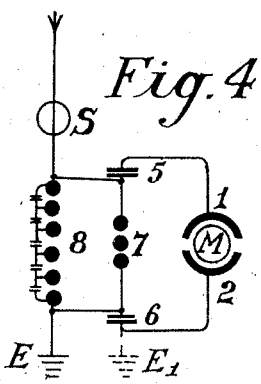
Figure 4 is a diagram showing the use of protective means.

In the diagram illustrated in Figure 4 the spark gap 7 is shunted across condensers 5 and 6 from the motor M. This construction affords mainly a better insulation of the motor against excess voltage and a uniform excitation through the spark gap 7.

Figure 5:
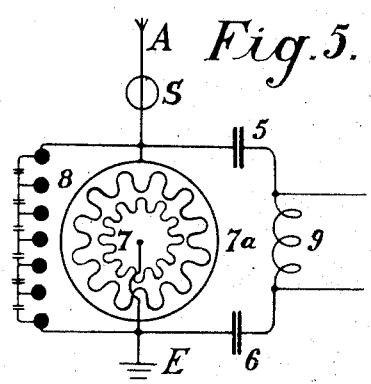
Figure 5 is a diagram of an arrangement for converting large current strengths.

In Figure 5 a diagram is illustrated for transforming large current strengths which may be employed direct without motors, for example, for lighting or heating purposes. The main difference is that here the spark gap consists of a star shaped disc 7 which can rotate on its own axis and is rotated by a motor opposite similarly fitted electrodes $7^a$. When separate points of stars face one another, discharges take place, thus forming an oscillation circuit over condensers 5 and 6 and inductance 9 for oscillatory discharges. It is evident that a motor may also be directly connected to the ends of the spiral 9.

Figure 6:
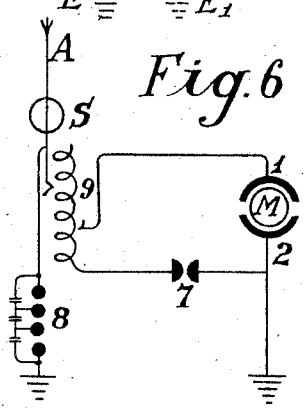
Figure 6 is a diagram of an arrangement including controlling means.

The construction of the diagram shown in Figure 6 permits of the oscillation circuit of the motor being connected with an induction coil. Here a regulating inductive resistance is introduced for counter-acting excess voltages in the motor. By cutting the separate coils 9 (coupled inductively to the aerial) in or out the inductive action on the motor may be more or less increased or variable aerial action may be exerted on the oscillation circuit.

In Figure 7 the oscillation circuit is closed through the earth (E and $E_1$). The spark gap 7 may be prolonged or shortened by more or fewer spark gaps being successively connected by means of a contact arm $7^b$.

Diagram 8 shows a unipolar connection of the motor with the aerial network. Here two oscillation circuits are closed through the same motor. The first oscillation circuit passes from aerial A through electromagnet S, point $x$, inductance $9^a$ to the earth condenser 6 and further, over spark gap 7 to the aerial condenser 5 and back to $x$. The second oscillation circuit starts from the aerial condenser 5 at the point $x^1$ over the inductance 9 to the earth condenser 6 at the point $x^3$ and through the condenser 6 over the spark gap 7 back to $x^1$. The motor itself is inserted between the two points of the spark gap 7. From this arrangement slightly damped oscillation wave currents are produced.

In the diagram illustrated in Figure 9 a loosely coupled system of connections is illustrated which is assumed to be for small motors for measuring purposes. A indicates the aerial conductor, S the electromagnet in the aerial conductor, 9 the inductance, 7 the spark gap, 5 and 6 condensers, E the earth, M the motor, and 1 and 2 stator connections of the motor. The motor is directly metallically connected with the oscillation circuit.

In Figure 10 a purely inductive coupling is employed for the motor circuit. The motor is connected with the secondary wire 10 as may be seen in Figure 11 in a somewhat modified diagram connection. The same applies to the diagram of Figure 12.

The diagrams hitherto described preferably allow of motors of small and medium strength to be operated. For large aggregates, however, they are too inconvenient as the construction of two or more oscillation circuits for large amounts of energy is difficult; the governing is still more difficult and the danger in switching on or off is greater.

A means of overcoming such difficulties is shown in Figure 13. The oscillation circuit here runs starting from the point $x$ over condenser 5, variable inductance 9, spark gap 7 and the two segments ($3^a$ and $4^a$) forming arms of a Wheatstone bridge, back to $x$. If the motor is connected by brushes 3 and 4 transversely to the two arms of the bridge as shown in the drawings, electromagnetic oscillations of equal sign are induced in the stator surfaces 1 and 2 and the motor does not revolve. If however, the brushes 3 and 4 are moved in common with the conducting wires 1 and 2 which connect the brushes with the stator poles a certain alteration or displacement of the polarity is obtained and the motor commences to revolve.

The maximum action will result if one brush 3 comes on the central sparking contact 7 and the other brush 4 on the part $x$. They are however, usually in practice not brought on to the central contact 7 but only held in the path of the bridge segments $4^a$ and $3^a$ in order not to connect the spark gaps with the motor oscillation circuit.

As however, the entire oscillation energy can thereby not act on the motor it is better to carry out the same system according to the diagram 14. The diagram 14 differs from the foregoing only by the motor not being directly metallically connected with the segments of the commutator, but only a primary coil 9 which induces in a secondary coil 10, current which feeds the motor M and takes the place of the rotor. By this arrangement a good transforming action is obtained, a loose coupling and also an oscillation circuit without a spark gap.

In Figure 15 the motor is not purely inductively as in 14, but directly metallically branched off from the primary coil (at $x$ and $x^1$) after the principle of the auto-transformer.

In Figure 16 instead of an inductance a condenser 6 is in similar manner, and for the same object inserted between the segments $3^a$ and $4^a$. This has the advantage that the segments $3^a$ and $4^a$ need not be made of solid metal but may consist of spiral coils whereby a more exact regulation is possible and further motors of high inductance may be employed.

The arrangements of Figures 17, 18 and 19 may be employed for use with resonance and particularly with induction condenser motors; between the large stator induction condenser surfaces, small reversing pole condensers are connected, which, as may be seen from Figures 17, 18 and 19 are led together to earth. Such reversing poles have the advantage that with large quantities of electrical energy the spark formation between the separate oscillation circuits ceases.

Figure 19 shows a further method which prevents electromagnetic oscillations of high number of alternations formed in the oscillation circuit striking back to the aerial conductor. It is based on the well known principle that a mercury lamp, one electrode of which is formed of mercury, the other of solid metal such as steel allows an electric charge to pass in only one direction from the mercury to the steel and not vice versa. The mercury electrode of the vacuum tube N is therefore connected with the aerial conductor and the steel electrode with the oscillation circuit. From this it results that charges can pass only from the aerial through the vacuum tube to the oscillation circuit, but not vice versa. Oscillations which are formed on being transformed in the oscillation circuit cannot pass to the aerial conductor.

In practice these vacuum tubes must be connected behind an electromagnet as the latter alone affords no protection against the danger of lightning.

As regards the use of spark gaps, all arrangements as used for wireless telegraphy may be used. Of course the spark gaps in large machines must have a sufficiently large surface. In very large stations they are cooled in liquid carbonic acid or better still in liquid nitrogen or hydrogen; in most cases the cooling may also take place by means of liquefied low homologues of the metal series or by means of hydrocarbons the freezing point of which lies at between —90° C. and —40° C. The spark gap casing must also be insulated and be of sufficient strength to be able to resist any pressure which may arise. Any undesirable excess super-pressure which may be formed must be automatically let off. I have employed with very good results mercury electrodes which were frozen in liquid carbonic acid, the cooling being maintained during the operation from the outside through the walls.

Figure 20 is one of the simplest forms of construction of an aerial network in combination with collectors, transformers and the like illustrated diagrammatically. E is here the earth wire, 8 the safety spark gap, 7 the working spark gap, 1 and 2 the stator surfaces of the motor, 5 a condenser battery, S the protective magnet which is connected with the coil in the aerial conductor, $A^1$ to $A^{10}$ aerial antennæ with collecting balloons, N horizontal collecting or connecting wires from which, to the centre a number of connections run.

The actual collectors consist of metal sheaths preferably made of an aluminium magnesium alloy, and are filled with hydrogen or helium and are attached to copper plated steel wires. The size of the balloon is selected so that the actual weight of the balloon and the weight of the conducting wire is supported thereby. On the top of the balloon aluminium spikes, made and gilded in a special manner hereinafter described, are arranged in order to produce a conductor action. Small quantities of radium preparations, more particularly polonium-ionium or mesothorium preparations considerably increase the ionization, and therewith the action of these collectors.

In addition to metal balloons, fabric balloons which are superficially metal coated according to Schoop's metal spraying process, may however also be employed. A metallic surface may also be produced by lacquering with metallic bronzes, preferably according to Schoop's spraying process or lacquering with metallic bronze powders in two electrical series of widely different metals, because thereby the collecting effect is considerably increased.

Instead of the ordinary round balloons, elongated cigar shaped ones may be employed. In order also to utilize the frictional energy of the wind, patches or strips of non-conducting substances which produce electricity by friction, may be attached to the metallized balloon surfaces. The wind will impart a portion of its energy in the form of frictional electricity, to the balloon casing, and thereby the collecting effect is substantially increased.

In practice however, very high towers (up to 300 metres is fully admissible) may be employed as antennæ. In these towers copper tubes rise freely further above the top of the tower. A gas lamp secured against the wind is then lit at the point of the copper tube and a netting is secured to the copper tube over the flame of this lamp to form a collector. The gas is conveyed through the interior of the tube up to the summit. The copper tube must be absolutely protected from moisture at the place at which it enters the tower and also rain must be prevented running down the walls of the tower which might lead to a bad catastrophe. This is done by bell shaped enlargements which expand downwards, being arranged in the tower in the form of high voltage insulators of Siamese pagodas.

Special attention must be devoted to the foundations of such towers. They must be well insulated from the ground, which may be obtained by first embedding a layer of concrete in a box form to a sufficient depth in the ground and inserting in this an asphalt lining and then glass bricks cast about 1 or 2 metres in thickness. Over this in turn there is a ferro-concrete layer in which alone the metal foot of the tube is secured. This concrete block must be at least 2 metres from the ground and be fully protected at the sides by a wooden covering, from moisture. In the lower part of the tower a wood or glass house for the large condenser batteries or for the motors may be constructed. In order to lead the earth connection to the ground water, a well insulated pit constructed of vitreous bricks, must be provided. Several such towers are erected at equal distances apart and connected with a horizontal conductor. The horizontal connecting wires may either run directly from tower to tower or be carried on bell shaped insulators similar to those in use for high voltage conductors. The width of the network may be of any suitable size and the connection of the motors can take place at any suitable places.

In order to collect large quantities of electricity with few aerials it is well to provide the aerial conductor with batteries of condensers as shown in two methods of construction in Figures 21 and 22. In Figure 21 the batteries of condensers 5 are connected on the one hand with the aerial electricity collectors Z by the aerial conductor A, and on the other hand interconnected in series with an annular conductor from which horizontal conductors run to the connecting points C to which the earth wire is connected.

Figure 22 shows a similar arrangement. Should two such series of antennæ rings be shown by a voltmeter to have a large difference of potential (for example, one in the mountains and one in the plain) or even of different polarity these differences may be compensated for by connecting sufficiently large condenser batteries (5, 5$^a$, 5$^b$) by means of Maji star conductors D and D$^1$. In Figure 23 a connection of three such rings of collectors to form a triangle with a central condenser battery is illustrated.

The condenser batteries of such large installations must be embedded in liquefied gases or in liquids freezing at very low temperatures. In such cases a portion of the atmospheric energy must be employed for liquefying these gases. It is also preferable to employ pressure. By this means the condenser surfaces may be diminished, and still allow for large quantities of energy to be stored, secure against breakdown. For smaller installations the immersing of the condensers in well insulated oil or the like, suffices. Solid substances on the other hand cannot be employed as insulators.

The arrangement in the diagrams hitherto described was always such that the condenser batteries were connected with both poles directly to the aerial conductors. An improved diagram of the connections for obtaining atmospheric electricity for the condenser batteries has however, been found to be very advantageous, this arrangement consists in that they are connected by only one pole (unipolar) to the collecting network. Such a method of arrangement is very important, as by means of it a constant current and an increase of the normal working pressure or voltage is obtained. If for example a collecting balloon aerial which is allowed to rise to a height of 300 metres, shows 40,000 volts above earth voltage, in practice it has been found that the working voltage (with a withdrawal of the power according to the method hereinbefore described by means of oscillating spark gaps and the like) is only about 400 volts. If however, the capacity of the condenser surfaces be increased, which capacity in the above mentioned case was equal to that of the collecting surface of the balloon aerials, to double the amount, by connecting the condenser batteries with only one pole, the voltage rises under an equal withdrawal of current up to and beyond 500 volts. This can only be ascribed to the favourable action of the connecting method.

In addition to this substantial improvement it has also been found preferable to insert double inductances with electromagnets and to place the capacities preferably between two such electromagnets. It has also been found that the useful action of such condensers can be further increased if an induction coil be connected as inductive resistance to the unconnected pole of the condenser, or still better if the condenser itself be made as an induction condenser. Such a condenser may be compared with a spring which when compressed carries in itself accumulated force, which it again gives off when released. In charging, a charge with reversed sign is formed at the other free condenser pole, and if through the spark gap a short circuit results, the accumulated energy is again given back since now new quantities of energy are induced at the condenser pole connected with the conductor network, which in fact charges with opposite signs to that at the free condenser pole. The new induced charges have of course the same sign as the collector network. The whole voltage energy in the aerial is thereby however increased. In the same space of time larger quantities of energy are accumulated than is the case without such inserted condenser batteries.

Figure 24:
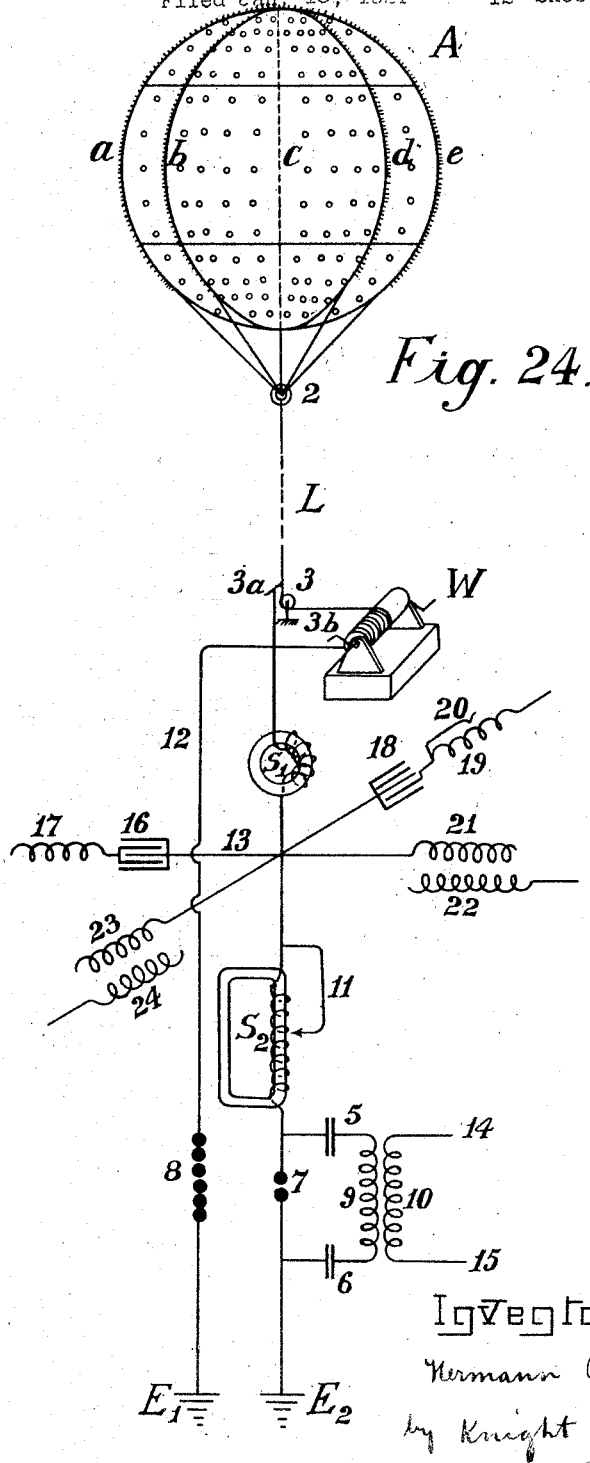
Figure 24 shows a collecting balloon and diagram of its connection of condenser batteries.

In Figures 24 and 25 two different diagrams of connections are more exactly illustrated, Figure 24 shows a collecting balloon and the diagram of the connections to earth. Figure 25 four collecting balloons and the parallel connection of the condenser batteries belonging thereto.

A is the collecting balloon made of an aluminium magnesium alloy (electron metal, magnalium) of a specific gravity of 1.8 and a thickness of plate 0.1 to 0.2 mm. Inside there are eight strong vertical ribs of T shaped section about 10 to 20 mm. in height and about 3 mm. in thickness with the projecting part directed inwards (indicated by $a$, $b$, $c$, $d$ and so forth); they are riveted together to form a firm skeleton and are stiffened in a horizontal direction by two cross ribs. The ribs are further connected with one another internally and transversely by means of thin steel wires, whereby the balloon obtains great power of resistance and elasticity. Rolled plates of 0.1 to 0.2 mm. in thickness made of magnalium alloy are then either soldered or riveted on this skeleton so that a fully metallic casing with smooth external surface is obtained. Well silvered or coppered aluminium plated steel wires run from each rib to the fastening ring 2. Further, the coppered steel hawser L preferably twisted out of separate thin wires (shown in dotted lines in Figure 24) and which must be long enough to allow the balloon to rise in the desired height, leads to a metal roller or pulley 3 and from thence to a winch W, well insulated from the earth. By means of this winch, the balloon, which is filled with hydrogen, or helium, can be allowed to rise to a suitable height (300 to 5,000 metres) and brought to the ground for recharging or repairs.

The actual current is taken directly through a friction contact from the metal roller 3 or from the wire, or even from the winch or simultaneously from all three by means of brushes (3, $3^a$ and $3^b$). Beyond the brushes the conductor is divided, the paths being:—firstly over 12 to the safety spark gap 8, from thence to the earth conductor $E^1$, and secondly over electromagnet $S^1$, point 13, to a second loose electromagnet having an adjustable coil $S^2$, then to the spark gap 7 and to the second earth conductor $E^2$. The actual working circuit is formed through the spark gap 7, condensers 5 and 6, and through the primary coil 9; here the static electricity formed by oscillatory discharges is accumulated and converted into high frequency electromagnetic oscillations. Between the electromagnets $S^1$ and $S^2$ at the crossing point 13, four condenser batteries are introduced which are only indicated diagrammatically in the drawings each by one condenser. Two of these batteries (16 and 18) are made as plate condensers and prolonged by regulating induction coils or spirals 17 and 19 while the two others (21 and 23) are induction condensers. As may be seen from the drawings each of the four condenser batteries 16, 18, 21, 23 is connected only by one pole to the aerial or to the collector conductor. The second poles 17, 19, 22, 24 are open. In the case of plate condensers having no inductive resistance an induction coil is inserted. The object of such a spiral or coil is the displacement of phase of the induction current by ¼ periods, whilst the charging current of the condenser poles which lie free in the air, works back to the collector aerial. The consequence of this is that in discharges in the collector aerial the back inductive action of the free poles allows a higher voltage to be maintained in the aerial collecting conductor than would otherwise be the case. It has also been found that such a back action has an extremely favourable effect on the wear of the contacts. Of course the inductive effect may be regulated at will within the limits of the size of the induction coil, the length of the coil in action being adjustable by means of wire connection without induction (see Fig. 24, No. 20).

$S^1$ and $S^2$ may also be provided with such regulating devices in the case of $S^2$ (illustrated by 11). If excess voltage be formed it is conducted to earth through the wire 12 and spark gap 8 or through any other suitable apparatus, since this formation would be dangerous for the other apparatus.

The action of these condenser batteries has already been hereinbefore described.

The small circles on the collector balloon indicate places at which zinc amalgam or gold amalgam or other photoelectric acting metals in the form of small patches in extremely thin layers (.01 to .05 mm. in thickness) are applied to the balloon casing of light metal. Such metallic patches may also be applied to the entire balloon as well as in greater thickness to the conducting network. The capacity of the collector is thereby considerably strengthened at the surface. The greatest possible effect in collecting may be obtained by polonium amalgams and the like. On the surface of the collector balloon metal points or spikes are also fixed along the ribs, which spikes serve particularly for collecting the collector charge. Since it is well known that the resistance of the spikes is less the sharper the spike is, for this purpose it is therefore extremely important to employ as sharp spikes as possible. Experiments made as regards these have shown that the formation of the body of the spike or point also plays a large part, for example, spikes made of bars or rollers with smooth surfaces, have a many times greater point resistance as collector accumulator spikes than those with rough surfaces. Various kinds of spike bodies have been experimented with for the collector balloons hereinbefore mentioned. The best results were given by spikes which were made in the following way. Fine points made of steel, copper, nickel, or copper and nickel alloys, were fastened together in bundles and then placed as anode with the points in a suitable electrolyte (preferably in hydrochloric acid or muriate of iron solutions) and so treated with weak current at 2 to 3 volts pressure. After 2 to 3 hours according to the thickness of the spikes or pins the points become extremely sharp and the bodies of the spikes have a rough surface. The bundle can then be removed and the acid washed off with water. The spikes are then placed as cathode in a bath consisting of solution of gold, platinum, iridium, paladium or wolfram salts or their compounds and coated at the cathode galvanically with a thin layer of precious metal, which must however be sufficiently firm to protect them from atmospheric oxidation.

Such spikes act at a 20 fold lower voltage almost as well as the best and finest points made by mechanical means. Still better results are obtained if polonium or radium salts are added to the galvanic bath when forming the protective layer or coating. Such pins have a low resistance at their points and even at one volt and still lower pressures have an excellent collector action.

In Figure 24 the three unconnected poles are not connected with one another in parallel. That is quite possible in practice without altering the principle of the free pole. It is also preferable to interconnect in parallel to a common collector network, a series of collecting aerials.

Figure 25 shows a diagram for such an installation. $A^1$, $A^2$, $A^3$, $A^4$ are four metal collector balloons with gold or platinum coated spikes which are electrolytically made in the presence of polonium emanations or radium salts, which spikes or needles are connected over four electro-magnets $S^1$, $S^2$, $S^3$, $S^4$, through an annular conductor R. From this annular conductor four wires run over four further electromagnets $S^a$, $S^b$, $S^c$, $S^d$, to the connecting point 13. There the conductor is divided, one branch passing over 12 and the safety spark gap 8 to the earth at $E^1$, the other over inductive resistance J and working spark gap 7 to the earth at $E^2$. The working circuit, consisting of the condenser 5 and 6 and a resonance motor or a condenser motor M, such as hereinbefore described, is connected in proximity round the sparking gap section 7.

Instead of directly connecting the condenser motor of course the primary circuit for high frequency oscillatory current may also be inserted.

The condenser batteries are connected by one pole to the annular conductor R and can be either inductionless (16 and 18) or made as induction condensers as shown by 21 and 23. The free poles of the inductionless condensers are indicated by 17 and 19, those of the induction condensers by 22 and 24. As may be seen from the drawings all these poles 17, 22, 19, 24 may be interconnected in parallel through a second annular conductor without any fear that thereby the principle of the free pole connection will be injured. In addition to the advantages already set forth the parallel connection also allows of an equalization of the working pressure in the entire collector network. Suitably constructed and calculated induction coils 25 and 26 may also be inserted in the annular conductor of the free poles, by means of which a circuit may be formed in the secondary coils 27 and 28 which allows current produced in this annular conductor by fluctuations of the charges or the like appearances to be measured or otherwise utilized.

According to what has been hereinbefore stated separate collector balloons may be connected at equidistant stations distributed over the entire country, either connected directly with one another metallically or by means of intermediate suitably connected condenser batteries through high voltage conductors insulated from earth. The static electricity is converted through a spark gap into dynamic energy of a high number of oscillations and may in such form be coupled as a source of energy by means of a suitable method of connecting, various precautions being observed, and with special regulations. The wires leading from the collector balloons have hitherto been connected through an annular conductor without this endless connection, which can be regarded as an endless induction coil, being able to exert any action on the whole conductor system.

Figure 26:
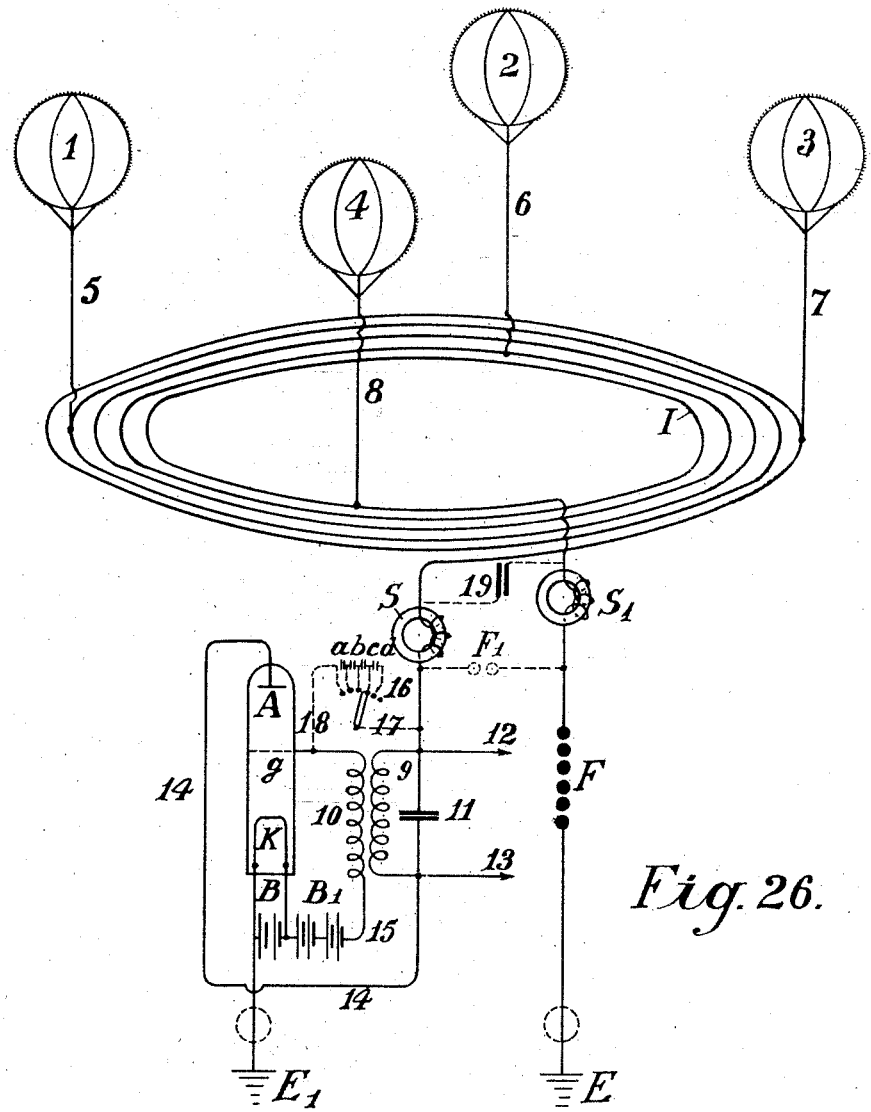
Figure 28:
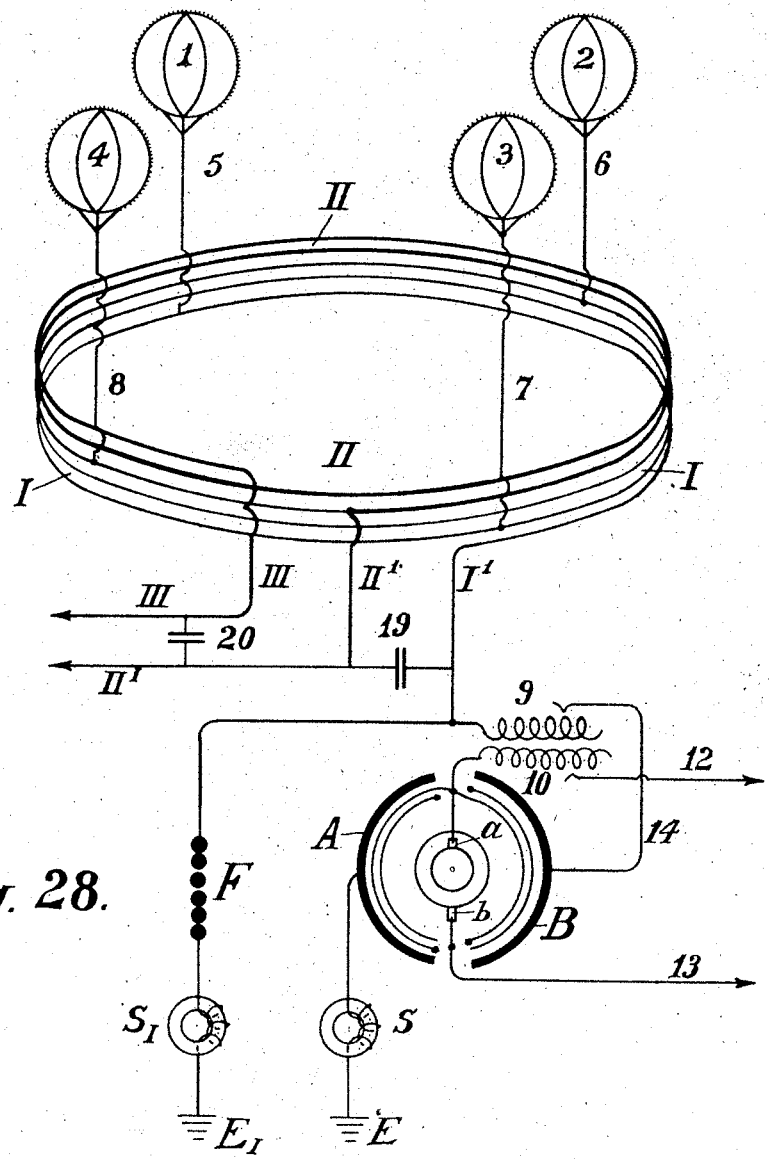
Figure 28 shows an auto-transformer method of connection.

It has now been found that if the network conductor connecting the aerial collector balloons with one another is not made as a simple annular conductor, but preferably short circuited in the form of coils over a condenser battery or spark gap or through thermionic tubes or valves or audions, then the total collecting network exhibits quite new properties. The collection of atmospheric electricity is thereby not only increased but an alternating field may be easily produced in the collector network. Further, the atmospheric electrical forces showing themselves in the higher regions may also be directly obtained by induction. In Figures 26 and 28 a form of construction is shown on the basis of which the further foundations of the method will be more particularly explained.

In Figure 26 1, 2, 3, 4 are metal collector balloons, 5, 6, 7, 8 their metallic aerial conductors and I the actual collector network. This consists of five coils and is mounted on high voltage insulators in the air, on high voltage masts (or with a suitable construction of cable embedded in the earth). One coil has a diameter of 1 to 100 km. or more. S and $S^1$ are two protective electromagnets, F the second safety section against excess voltage, E its earth conductor and $E^1$ the earth conductor of the working section. When an absorption of static atmospheric electricity is effected through the four balloon collectors, the current in order to reach the earth connection $E^1$ must flow spirally through the collector network over the electromagnet S, primary induction coil 9, conductor 14, anode A of the audion tube, incandescent cathode K, as the way over the electromagnet and safety spark gap F offers considerably greater resistance. Owing to the fact that the accumulated current flows in one direction, an electromagnetic alternating field is produced in the interior of the collector network coil, whereby the whole free electrons are directed more or less into the interior of the coil. An increased ionization of the atmosphere is therefore produced. In consequence of this the points mounted on the collector balloon show a considerably reduced resistance and therefore increased static charges between the points on the balloon and the surrounding atmosphere are produced. The result of this is a considerably increased collector effect.

A second effect which could not be obtained otherwise is obtained by the electromagnetic alternating field which running parallel to the earth surface, acts more or less with a diminishing or increasing effect on the earth magnetic field, whereby in the case of fluctuations in the current a return induction current of reversed sign is always produced in the collector coil by earth magnetism. Now if, however, a constantly pulsating continuous alternating field is produced as stated in the above collector network I, an alternating current of the same periodicity is produced also in the collecting network coil. As the same alternating field is further transmitted to the aerial balloon, the resistance of its points is thereby considerably reduced, whilst the collector action is considerably increased. A further advantage is that positive electrons which collect on the metal surfaces during the conversion into dynamic current produce a so-called drop of potential of the collector area. As an alternating field is present, the negative ions surrounding the collector surfaces, when discharge of the collector surfaces takes place produce by the law of induction, an induction of reversed sign on the collector surface and so forth (that is to say again a positive charge). In addition to the advantages hereinbefore set forth, the construction of connecting conductors in coil form when of sufficiently large diameter, allows of a utilization of energy arising in higher regions also in the simplest way. As is well known electric discharges frequently take place at very great elevations which may be observed, such as St. Elmo's fires or northern lights. These energy quantities have not been able to be utilized up to now. By this invention all these kinds of energy, as they are of an electromagnetic nature and the direction of the axis of the collector coils stands at right angles to the earth's surface, can be more or less absorbed in the same way as a receiver in wireless telegraphy absorbs waves coming from a far distance. With a large diameter of the spiral it is possible to connect large surfaces and thereby to take up also large quantities of energy.

It is well known that large wireless stations in the summer months, and also in the tropics are very frequently unable to receive the signals in consequence of interruptions which are caused by atmospheric electricity, and this takes place with vertical coils of only 40 to 100 m. diameter. If on the contrary horizontal coils of 1 to 100 km. diameter be employed very strong currents may be obtained through discharges which are constantly taking place in the atmosphere. Particularly in the tropics or still better in the polar regions where the northern lights are constantly present, large quantities of energy may probably be obtained in this way. A coil with several windings should act the best. In similar manner any alteration of the earth magnetism should act inductively on such a coil.

It is not at all unlikely that earthquakes and spots on the sun will also produce an induction in such collector coils of sufficient size. In similar manner this collector conductor will react on earth currents more particularly when they are near the surface of the earth or even embedded in the earth. By combining the previous kind of current collectors so far as they are adapted for the improved system with the improved possibilities of obtaining current the quantities of free natural energy which are to be obtained in the form of electricity are considerably increased.

In order to produce in the improved collector coil uniform current oscillations of an undamped nature so-called audion high vacuum or thermionic tubes of suitable connection are employed instead of the previously known spark gaps (Fig. 26, Nos. 9–18). The main aerial current flows through electromagnet S (which in the case of a high number of alternations is not connected here but in the earth conductor $E^1$) and may be conveyed over the primary coils in the induction winding through wire 14 to the anode A of the high vacuum grid tube. Parallel with the induction resistance 9 a regulating capacity of suitable size, such as condenser 11 is inserted. In the lower part of the vacuum grid tube is arranged the incandescent filament or the cathode K which is fed through a battery B. From the battery B two branches run, one to the earth conductor $E^1$ and the other through battery $B^1$ and secondary coil 10 to the grid anode $g$ in the vacuum tube. By the method of connections shown in dotted lines, a desired voltage at the grid electrode $g$ may also be produced through the wire 17 which is branched off from the main current conductor through switches 16 and some small condensers ($a, b, c, d$) connected in series, and conductor 18, without the battery $B^1$ being required.

The action of the entire system is somewhat as follows:—

On the connecting conductor of the aerial collector network being short circuited to earth, the condenser pole 11 is charged and slightly damped oscillations are formed in the short circuited existing oscillation circuit formed of the condenser 11 and self inductance 9. In consequence of the coupling through coil 10, fluctuations of voltage take place in the grid circuit 15 with the same frequency, which, fluctuations in turn influence the strength of the electrode current passing through the high vacuum amplyfying tube and thus produce current fluctuations of the same frequency in the anode circuit. A permanent supply of energy to the oscillation circuits 9 and 10 consequently takes place, until a condition of balance is set up, in which the consumed oscillation energy is equal to that absorbed. Thereby constant undamped oscillations are now produced in the oscillation circuits 9–11.

For regular working of such oscillation producers high vacuum strengthening tubes are necessary and it is also necessary that the grid and anode voltages shall have a phase difference of 180° so that if the grid is negatively charged, then the anode is positively charged and vice versa. This necessary difference of phase may be obtained by most varied connections, for example, by placing the oscillation circuit in the grid circuit or by separating the oscillation circuit and inductive coupling from the anodes and the grid circuit and so forth.

A second important factor in this way of converting static atmospheric electricity into undamped oscillations is that care must be taken that the grid and anode voltages have a certain relation to one another; the latter may be obtained by altering the coupling and a suitable selection of the self induction in the grid circuit, or as shown by dotted lines 18, 17, 16 by means of a larger or smaller number of condensers of suitable size connected in series; in this case the battery $B^1$ may be omitted. With a suitable selection of the grid potential a glow discharge takes place between the grid $g$ and the anode A, and accordingly at the grid there is a cathode drop and a dark space is formed. The size of this cathode drop is influenced by the ions which are emitted in the lower space in consequence of shock ionization of the incandescent cathodes K and pass through the grid in the upper space. On the other hand the number of the ions passing through the grid is dependent on the voltage between the grid and the cathode. Thus if the grid voltage undergos periodic fluctuations (as in the present case) the amount of the cathode drop at the grid fluctuates and consequently the internal resistance of the tube correspondingly fluctuates, so that when a back coupling of the feed circuit with the grid circuit takes place, the necessary means are afforded for producing undamped oscillations and of taking current, according to requirements from the collecting conductor.

The frequency of the undamped oscillations produced is with a suitably loose coupling equal to the self frequency of the oscillation circuits 9 and 10. By a suitable selection of the self induction of the coil 9 and capacity 11 it is possible to extend from frequencies which produce electromagnetic oscillations of only a few metres wave length down to the lowest practical alternating current frequency. For large installations a suitable number of frequency producing tubes in the form of the well known high vacuum transmission tubes of .5 to 2 kw. in size may be connected in parallel so that in this respect no difficulty exists.

The use of such tubes for producing undamped oscillations, and also the construction and method of inserting such transmission tubes in an accumulator or dynamo circuit is known and also that such oscillation producing tubes only work well at voltages of 1,000 up to 4,000 volts, so that on the contrary their use at lower voltages is considerably more difficult. By the use of high voltage static electricity this method of producing undamped oscillations as compared with that through spark gaps must be regarded as an ideal solution particularly for small installations of outputs of from 1 to 100 kw.

By the application of safety spark gaps, with interpolation of electro-magnets, not only is short circuiting avoided but also the taking up of current is regulated. Oscillation producers inserted in the above way form a constantly acting electromagnetic alternating field in the collector coil, whereby as already stated, a considerable accumulating effect takes place. The withdrawal wire or working wire is connected at 12 and 13, but current may be taken by means of a secondary coil which is firmly or movably mounted in any suitable way inside the large collector coil, i. e. in its electromagnetic alternating field, so long as the direction of its axis runs parallel with that of the main current collecting coil.

In producing undamped oscillations of a high frequency (50,000 per second and more) in the oscillation circuits 9 and 11, electromagnets S and $S^1$ must be inserted if the high frequency oscillations are not to penetrate the collector coil, between the oscillation producers and the collector coil. In all other cases they are connected shortly before the earthing (as in Figs. 27 and 28).

Figure 27:
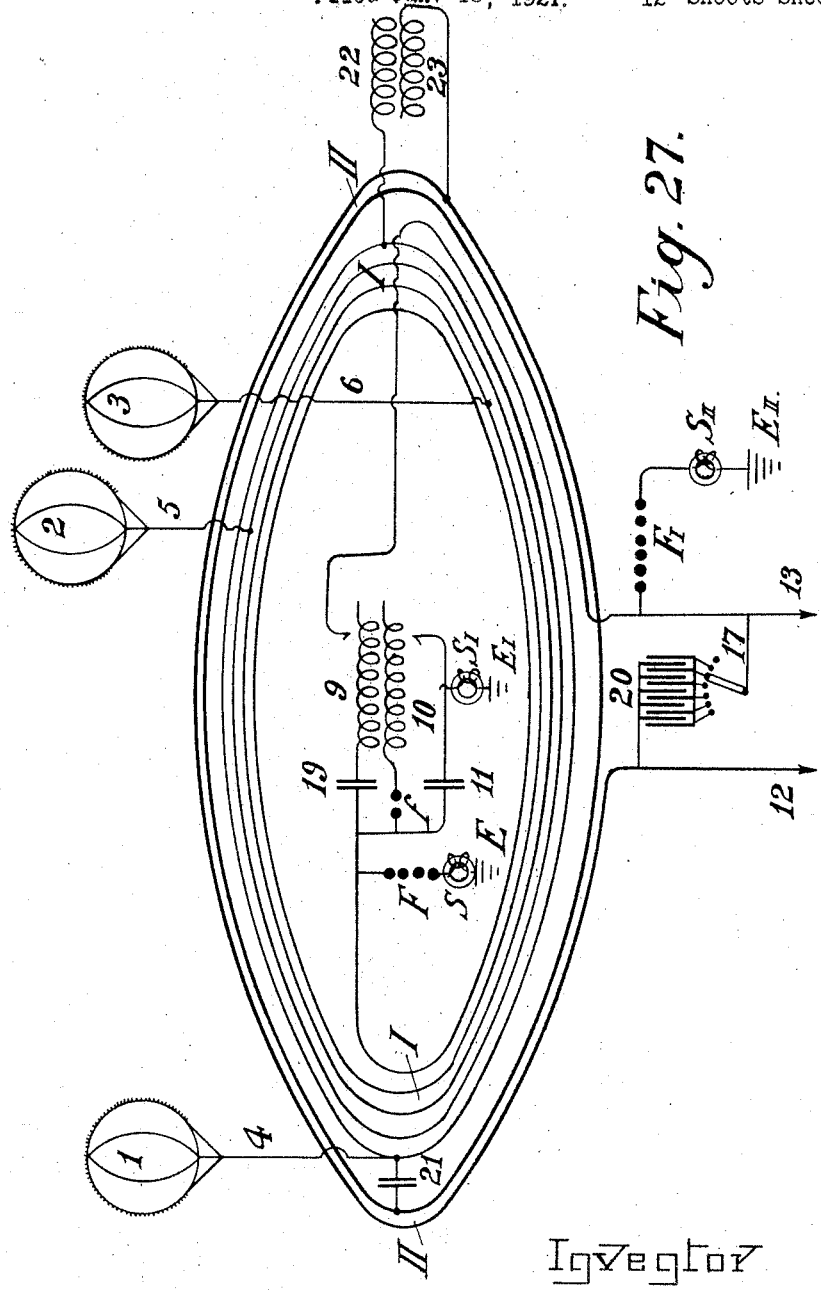
Figure 27 shows a second method of connecting conductor for the balloon aerials.

In Figure 27 a second method of construction of the connecting conductor of the balloon aerials is illustrated in the form of a coil. The main difference consists in that in addition to the connecting conductor I another annular conductor II is inserted parallel to the former on the high voltage masts in the air (or embedded as a cable in the earth) but both in the form of a coil. The connecting wire of the balloon aerials is indicated as a primary conductor and also as a current producing network; the other is the consumption network and is not in unipolar connection with the current producing network.

In Figure 27 the current producing network I is shown with three balloon collectors 1, 2, 3 and aerial conductors 4, 5, 6; it is short circuited through condenser 19 and inductance 9. The oscillation forming circuit consists in this diagram of spark gap $f$, inductance 10, and condenser 11; the earth wire E, is connected to earth over electromagnet $S^1$. F is the safety spark gap which is also connected to earth through a second electromagnet S at $E_1$. On connecting up the condenser circuit 11 this is charged over the spark gap $f$ whereby an oscillatory discharge is formed. This discharging current acts through inductance 10 on the inductively coupled secondary 9, whereby in the producing network a modification of the potential of the condenser 19 is produced. The consequence of this is that oscillations arise in the coil shaped producer network. These oscillations induce a current in the secondary circuit II, which has a smaller number of windings and a less resistance, the voltage of which, according to the proportion of the number of windings and of the ohmic resistance, is considerably lower whilst the current strength is greater.

In order to convert the current thus obtained into current of an undamped character, and to tune its wave lengths, a sufficiently large regulatable capacity 20 is inserted between the ends 12 and 13 of the secondary conductor II. Here also current may be taken without an earth conductor, but it is advisable to insert a safety spark gap $E^1$ and to connect this with the earth over an electromagnet $S^2$.

The producer network may be connected with the working network II over an inductionless condenser 21 or over an induction condenser 22, 23. In this case the secondary conductor is unipolarly connected with the energy conductor.

In Figure 28 the connecting conductor between the separate accumulator balloons is carried out according to the autotransformer principle. The collecting coil connects four aerial balloons 1, 2, 3, 4, the windings of which are not made side by side but one above the other. In Figure 28 the collector coil I is shown with a thin line, the metallically connected prolongation coils II with a thick line. Between the ends $I^1$ and $II^1$ of the energy network I a regulating capacity 19 is inserted. The wire $I^1$ is connected with the output wire and with the spark gap F.

As transformer of the atmospheric electricity an arrangement is employed which consists in using rotary pairs of condensers in which the one stator surface B is connected with the main current, whilst the other A is connected with the earth pole. Between these pairs of short circuited condensers are caused to rotate from which the converted current can be taken by means of two collector rings and brushes, in the form of an alternating current, the frequency of which is dependent on the number of balloons and the revolutions of the rotor. As the alternating current formed in the rotor can act, in this improved method of connection described in this invention, through coils 10 on the inductance 9, an increase or diminution of the feed current in I can be obtained according to the direction of the current by back induction. Current oscillations of uniform rhythm thereby result in the coil shaped windings of the producer net-work.

As the ends of this conductor are short circuited through the regulatable condenser 19 these rhythms produce short circuited undamped oscillations in the energy conductor, the periodicity and wave lengths of which oscillations can be adjusted according to desire by altering the capacity 19 to a given wave length and therewith also to a given frequency. These currents may also be employed in this form directly as working current through the conductors II¹ and III. By inserting the condenser 20 a connection between these conductors may also be made, whereby harmonic oscillations of desired wave length are formed. By this means quite new effects as regards current distribution are obtained. The withdrawal of current can even take place without direct wire connection if, at a suitable point in the interior of the producing network (quite immaterially whether this has a diameter of 1 or 100 km.) a coil tuned to these wave lengths and of the desired capacity is firmly or movably mounted in the aerial conductor in such a way that its axial direction is in parallel with that of the collector coil. In this case a current is induced in the producing network, the size of which is dependent on the total capacity and resistance and also on the periodicity employed. A possibility is thereby afforded in future, of taking energy from the producer network by wireless means. As thereby in addition to atmospheric electricity also magnetic earth currents and the energy from the higher atmosphere (at least partially) may be simultaneously obtained, this last system for collecting the atmospheric energy is of particular importance for the future.

Of course everywhere instead of spark gaps suitable grid vacuum tubes may be employed as producers for undamped oscillations. The separate coils of the producer net-work with large diameters may be connected with one another through separate conductors all in parallel or all in series or in groups in series. By regulating the number of oscillations and also the extent of the voltage more or less large collector coils of this kind may be employed. The coils may also be divided spirally over the entire section. The coils may be carried out in annular form or also in triangular, quadrangular, hexagonal or octagonal form.

Of course wires may be carried from a suitable place to the centre or also laterally which serve the current waves as guides. This is necessary when the currents have to be conducted over mountains and valleys and so forth. In all these cases the current must be converted into a current of suitable periodicity.

As already hereinbefore mentioned separate collecting balloons may be directly metallically interconnected at equidistant stations distributed over the entire country or may be connected by interpolation of suitable condenser batteries by means of high voltage conductors. The static electricity is converted through a spark gap into dynamic energy of a high number of oscillations, and could then in such form, with a suitable arrangement of the connections, observing various measures of precaution, be employed as source of energy after separate or special regulation.

According to this invention in order to increase the collecting effect of the balloon in the aerial collector conductor or in the earth wire, radiating collectors are employed. These consist either of incandescent metal or oxide electrodes in the form of vacuum grid tubes, or electric arcs (mercury and the like electrodes) Nernst lamps, or finally flames of various kinds may be simply connected with the respective conductor.

It is well known that energy can be drawn off from a cathode consisting of an incandescent body opposite an anode charged with positive electricity (vacuum grid tube). Hitherto however, a cathode was always first directly placed opposite an anode, and secondly the system always consisted of a closed circuit.

Now if we dispense with the ordinary ideas in forming light or flame arcs in which a cathode must always stand directly opposite an anode, and if we place an incandescent cathode opposite an anode charged to a high potential or another body freely floating in the air, or regard the incandescent cathode only as a source of unipolar discharge (which represent group and point discharges in electro-static machines similar to unipolar discharges), it may be ascertained that incandescent cathodes and less perfectly all incandescent radiators, flames and the like admit of relatively large current densities and allow large quantities of electric energy to radiate into the open space in the form of electron streams as transmitters.

The object of this invention is as described below, if such incandescent oxide electrodes or other incandescent radiators or flames are not freely suspended in space but connected metallically with the earth so that they can be charged with negative terrestrial electricity, these radiators possess the property of absorbing the free positive electrical charges contained in the air space surrounding them (that is to say of collecting them and conducting them to earth). They can therefore, serve as collectors and have, in comparison to the action of the spikes, or points, a very large radius of action R; the effective capacity of these collector is much greater than the geometrical capacity ($R_0-$) calculated in an electro-static sense.

Now as our earth is surrounded as is well known, with an electro-static field and the difference of potential $$\frac{\delta V}{\delta h}$$

of the earth field according to the latest investigations, is in summer about 60 to 100 volts and in winter 300 to 500 volts per metre of difference in height ($\delta h$), a simple calculation gives the result that when such a radiation collector or flame collector is arranged for example on the ground, and a second one is mounted vertically over it at a distance of 2,000 metres and both are connected by a conducting cable, there is a difference of potential in summer of about 2,000,000 volts and in winter even of 6,000,000 volts and more.

According to Stefan Boltzmann's law of radiation, the quantity of energy which an incandescent surface (temperature T) of 1 sq. cm. radiates in a unit of time into the open air (temperature $T_o$) is expressed by the following formula:

$$S = 6 \, (T^4 - T^4_o) \text{ watt/sq. cm.}$$

and the universal radiation constant $6$ is according to the latest researches of Ferry (Annales de Chimie et de physique 17 page 267 (1909)) equal to $6.30 \times 10^{-12}$ watt/sq. cm.

Now if an incandescent surface of 1 sq. cm. shows, as compared with the surrounding space a periodic fall of potential $\delta V$ it radiates (independent of the current direction, that is to say of the sign) in accordance with the above formula, for example at a temperature of 3725° C. an energy of 1.6 kw. per sq. cm. per second. As for the radiation the same value can be calculated for the collection of energy, but reversed. Now as carbon electrodes at the temperature of the electric arc support on the current basis a current density up to from 60 to 65 amperes per sq. cm. no difficulties will result in this direction in employing radiating collectors as accumulators.

If the earth be regarded as a cosmically insulated condenser in the sense of geometrical electro-statics $x$ there results from the geometric (compare Ewald Rasch, "das elektrische Bogenlicht" (The electric arc light) page 169) capacity of the earth according to Chwolson:

For negative charging $1.3 \times 10^6$ Coulomb
For negative potential $V = 10 \times 10^8$ volts.
From this there results however, $EJT \cong 24.7 \times 10^{24}$ watt/Sec. Now if it is desired to make a theoretic short circuit through an earthed flame collector this would represent an electric total work of about $79,500 \, 10^{10}$ kilowatt years. As the earth must be regarded as a rotating mechanism which is thermo-dynamically, electromagnetically, and also kinematically coupled with the sun and stars system by cosmic radiations and gravitation a diminution of the electric energy of the earth field is not to be feared. The energies which the incandescent collectors would withdraw from the earth field can only cause by the withdrawal of motor work a lowering of the earth temperature (temperature $T_E = 300$) and reduce this to that of the world space (T=O) by using the entire energy. This is however not the case as the earth does not represent a cosmically entirely insulated system. On the contrary there is conveyed to the same according to the recent value corrected by Ferry for the solar constants through the radiation from the sun an energy of $18,500 \times 10^{10}$ kw. Accordingly any lowering of the earth temperature ($T_E$) without a simultaneous lowering of the sun's temperature ($T_S$) would contradict Stefan Boltzmann's law of radiation.

$$S = 6 \, (T_S^4 - T_E^4).$$

From this it must be concluded that if the earth temperature ($T_E$) sinks, the total radiation S absorbed by the earth increases, and further also that the secular speed of cooling of the earth is directly dependent on that of the sun and the other radiators cosmically coupled with the sun and is connected most closely with these.

The incandescent radiation collectors may, according to this invention, be employed for collecting atmospheric electricity if they (1) are charged with the negative earth electricity (that is to say when they are directly connected by means of a metallic conductor with the earth) and (2) if large capacities (metal surfaces) charged with electricity are mounted opposite them as positive poles in the air. This is regarded as the main feature of the present invention as without these inventive ideas it would not be possible to collect with an incandescent collector, sufficiently large quantities of the electrical charges contained in the atmosphere as technology requires; the radius of action of the flame collectors would also be too small, especially if it be considered that the very small surface density (energy density) ($6$ about $= 2 \times 7 \cdot 10^9$ St. E. per sq. cm.) does not allow of large quantities of charge being absorbed from the atmosphere.

$x$) Calculated according to Poisson's calculation;

$\Delta V = -4\pi \delta$; as here the alteration of the potential or potential gradients only takes place in the direction of the normal, this calculation assumes the simple form $$\delta = \frac{1}{4\pi} \times \frac{\delta^2 V}{\delta n^2}$$

It has indeed already been proposed to employ flame collectors for collecting atmospheric electricity and it is known that their collecting effect is substantially greater opposite the points. It is however, not known that the quantities of current which could hitherto be obtained are too small for technical purposes. According to my experiments the reason for this is to be found in the too small capacities of the collector conductor poles. If such flame or radiating collectors have no or only small positive surfaces, their radius of action for large technical purposes is too small. If the incandescent collectors be constantly kept in movement in the air they may collect more according to the speed of the movement, but this is again not capable of being carried out in practice.

By this invention the collector effect is considerably increased by a body charged with a positive potential and of the best possible capacity being also held floating (without direct earth connection) opposite such an incandescent collector which is held floating in the air at a desired height. If for example, a collecting balloon of sheet metal or of metalized balloon fabric be caused to mount to 300 up to 3,000 metres in the air and as positive pole it is brought opposite such a radiating collector connected by a conductor to earth, quite different results are obtained.

The metallic balloon shell (with a large surface) is charged to a high potential by the atmospheric electricity. This potential is greater the higher the collecting balloon is above the incandescent collector. The positive electricity acts concentratedly on the anode floating in the air as it is attracted through the radiation shock ionization, proceeding from the incandescent cathode. The consequence of this is that the radius of action of the incandescent cathode collector is considerably increased and thereby also the collecting effect of the collecting balloon surface. Further the large capacity of the anode floating in the air plays therefore an important part because it allows of the taking of large charges, and thereby a more uniform current is obtained even when there is a large consumption; this cannot be the case with small surfaces.

In the present the metallic collecting balloon is a positive anode floating in the air and the end of the earth conductor of this balloon serves as positive pole surface opposite the surface of the radiating incandescent cathode, which in turn is charged with negative earth electricity being conductingly connected to earth.

The process may be carried out by two such contacts (negative incandescent cathode and anode end of a capacity floating in the air) a condenser and an inductive resistance being switched on in parallel, whereby simultaneously undamped oscillations may be formed.

In very large installations it is advisable to connect two such radiating collectors in series. Thus an arc light incandescent cathode may be placed below on the open ground and an incandescent cathode which is heated by special electro-magnetic currents be located high in the air. Of course for this the special vacuum Liebig tubes with or without grids may also be employed. An ordinary arc lamp with oxide electrodes may be introduced on the ground and the positive pole is not directly connected with the collecting balloon, but through the upper incandescent cathode or over a condenser. The method of connecting the incandescent cathode floating in the air may be seen in Figs. 29–33.

B is the air balloon, K a Cardan ring (connection with the hawser) C the balloon, L a good conducting cable, P a positive pole, N negative incandescent cathode, and E earth conductor.

Fig. 29 represents the simplest form of construction. If electric oscillations are produced below on the ground by means of a carbon arc lamp or in other suitable way a considerably greater electric resistance is opposed to that in the direct way by inserting an electrical inductive resistance 9. Consequently between P and N a voltage is formed, and as, over N and P only an inductionless ohmic resistance is present, a spark will spring over so long as the separate induction co-efficients and the like are correctly calculated. The consequence of this is that the oxide electrode (carbon or the like) is rendered incandescent and then shows as incandescent cathode an increased collecting effect. The positive poles must be substantially larger than the negative in order that they may not also become incandescent. As they are further connected with the large balloon area which has a large capacity and is charged at high voltage, an incandescent body which is held floating in the air and a positive pole which can collect large capacities is thereby obtained in the simplest way. The incandescent cathode is first caused to become incandescent by means of separate energy produced on the earth, and then maintained by the energy collected from the atmosphere.

Fig. 30 only shows the difference that instead of a round balloon a cigar shaped one (of metal or metalized fabric) may be employed and also a condenser 5 is inserted between the incandescent cathode and the earth conductor so that a short circuited oscillation circuit over P. N 5 and 9 is obtained. This has the advantage that quite small quantities of electricity cause the cathode to become incandescent and much larger cathode bodies may be rendered incandescent.

In this form of construction both the incandescent cathode and also the positive electrode may be enclosed in a vacuum chamber as may be seen in Fig. 32. A cable L is carried well insulated through the cover of a vessel and ends in a condenser disc 5. The cover is arched in order to keep off the rain. The vessel is entirely or partially made of magnetic metal and well insulated inside and outside. Opposite the disc 5 another disc 6 and on this again a metallic positive pole of the vacuum tube g with the incandescent cathode (oxide electrode) N is arranged. The negative electrode is on the one hand connected with the earth conductor E, and on the other hand with the inductive resistance 9 which is also connected with the cable L with the positive pole and wound round the vessel in coils. The action is exactly the same as that in Fig. 29 only instead of an open incandescent cathode one enclosed in vacuo is employed. As in such collectors only small bodies can be brought to incandescence in large installations a plurality of such vacuum tubes must be inserted in proximity to one another. According to the previous constructions Figs. 31 and 33 are quite self evident without further explanations.

Figs. 34–37 represent further diagrams of connections over radiating and flame collectors, and in fact, how they are to be arranged on the ground.

Fig. 34 shows an arc light collector with oxide electrodes for direct current and its connection; Fig. 35 a similar one for alternating current, Fig. 36 an incandescent collector with a Nernst lamp and Fig. 37 a similar one with a gas flame.

The positive pole 1 of the radiating collectors is always directly connected to the aerial collecting conductor A. In Fig. 34 this is further connected over the condenser battery 5 with a second positive electrode 3. The direct current dynamo b produces current which flows over between the electrodes 3 and 2 as an arc light. On the formation of an arc the negative incandescent electrode 2 absorbs electricity from the positive poles standing opposite it and highly charged with atmospheric electricity and conveys the same to the working circuit. The spark gap 7, inductive resistance 9 and induction coil 10 are like the ones previously described. The protective electromagnet S guards the installation against earth circuiting, the safety spark gap 8 from excess voltage or overcharging.

In Fig. 35 the connection is so far altered that the alternating current dynamo feeds the exciting coil 11 of the induction condenser. 12 is its negative and 13 its positive pole; if the coil 3 on the magnet core of the dynamo is correctly calculated and the periodicity of the alternating current is sufficiently high an arc light can be formed between the two poles 1 and 2. As the cathode 2 is connected with the negatively charged earth, and therefore always acts as a negative pole, a form of rectification of the alternating current produced by the dynamo 3 is obtained, the second half of the period is always suppressed. The working circuit may be carried out in the same way as in Fig. 34; the working spark gap 7 may however be dispensed with, and instead thereof between the points n and m a condenser 5 and an induction resistance 9 may be inserted from which the current is taken inductively.

Fig. 36 represents a form of construction similar to Fig. 34 only that here instead of an arc lamp a Nernst incandescent body is employed. The Nernst lamp is fed through the battery 3. The working section is connected with the negative pole, the safety spark gap with the + poles. The working spark gap 7 may also be dispensed with and the current for it taken at 12 over the oscillation circuit 5, 11 (shown in dotted lines).

Flame collectors (Fig. 37) may also be employed according to this invention. The wire network 1 is connected with the aerial collector conductor A and the burner with the earth. At the upper end of the latter, long points are provided which project into the flame. The positive electrode is connected with the negative over a condenser 5 and the induction coil 9 with the earth.

The novelty in this invention is firstly, the use of incandescent cathodes opposite positive poles which are connected with large metallic capacities as automatic collecting surfaces, (2) the connection of the incandescent cathodes with the earth whereby, in addition to the electricity conveyed to them from the battery or machine which causes the incandescing, also the negative charge of the earth potential is conveyed, and (3) the connection of the positive and negative poles of the radiating collectors over a condenser circuit alone or with the introduction of a suitable inductive resistance, whereby simultaneously an oscillatory oscillation circuit may be obtained. The collecting effect is by these methods quite considerably increased.

I declare that what I claim is:—

1. An electrical energy generating system, comprising a conducting surface for static charges, means to support same at a distance above the earth, a conductor leading to the earth level, a spark gap associated with said conductor to convert electrostatic charges into electromagnetic high frequency oscillations means to supply said electromagnetic energy to a net work, and a spark gap of greatly increased relative resistance in parallel therewith.

2. An electrical energy generating system comprising a conductor, means to support same above the earth level, an inductance therein, a spark gap associated with said conductor, a second spark gap of much higher relative resistance in parallel therewith and an energy receiving circuit coupled with the spark gap of lesser resistance.

3. An electrical energy generating system comprising a collecting surface, means to support same above the earth level, a conductor connecting said collecting surface with the earth level, a choke in said conductor, an electromagnetic resistance converting electrostatic energy to electromagnetic energy, a safety higher resistance in parallel therewith and a net work coupled with the conversion resistance of lesser value.

4. An electrical energy generating system comprising electric conductors spaced above the earth to form electromagnetic oscillating circuits, conductors connecting to earth level, electrostatic to electromagnetic energy conversion means therein, a safety high electrostatic resistance in parallel therewith and means to alter the electromagnetic characteristic of the circuits.

5. An electrical energy generating system comprising in combination a static collecting surface arranged above the earth, conductors connecting to earth level, a pair of spark gaps in parallel of different electrostatic resistance, a utilization net work shunted across the spark gap of lesser resistance and an electromagnetic choke in said conductors.

6. An electrical energy generating system comprising an open circuit energy collecting aerial, a pair of sparking gaps in parallel of widely different resistance, connected thereto and a closed electric oscillation circuit in shunt across the gap of lesser resistance.

7. An electrical energy generating system comprising an open circuit energy collecting aerial, a pair of sparking gaps in parallel of widely different resistance connected thereto, a closed electric oscillation circuit in shunt across the gap of lesser resistance, a plurality of electrostatic collecting surfaces, means to connect said collecting surfaces in parallel in groups and means to connect said groups symmetrically with said aerial.

In witness whereof, I have hereunto signed my name this 30 day of Dec., 1920, in the presence of two subscribing witnesses.

HERMANN PLAUSON.

Witnesses:
H. F. ARMSTRONG,
W. H. BEESTON.